United States Patent
Darken et al.

(10) Patent No.: US 6,785,636 B1
(45) Date of Patent: Aug. 31, 2004

(54) FAULT DIAGNOSIS IN A COMPLEX SYSTEM, SUCH AS A NUCLEAR PLANT, USING PROBABILISTIC REASONING

(75) Inventors: Christian Darken, Riverton, NJ (US); Nugroho I. Santoso, Plainsboro, NJ (US); Jochen Erdmann, Oberasbach (DE)

(73) Assignee: Siemens Corporate Research, Inc., Princeton, NJ (US)

(*) Notice: Subject to any disclaimer, the term of this patent is extended or adjusted under 35 U.S.C. 154(b) by 0 days.

(21) Appl. No.: 09/522,884

(22) Filed: Mar. 10, 2000

Related U.S. Application Data
(60) Provisional application No. 60/134,159, filed on May 14, 1999.

(51) Int. Cl.[7] ............................................... G06F 17/00
(52) U.S. Cl. ......................... 702/185; 702/181; 702/183
(58) Field of Search ................................ 702/179–188, 702/33, 58, 59, 108, 113–115, 119, 122, 123, 127, FOR 103, FOR 104, FOR 111, FOR 113, FOR 114, FOR 123, FOR 124, FOR 133, FOR 134, FOR 135, FOR 139, FOR 141, FOR 170, FOR 171; 376/215, 216; 706/20, 911–916, 904–907, 52; 703/6, 7, 18, 4; 345/965, 968–970; 700/26, 47–49, 79–81, 83

(56) References Cited

U.S. PATENT DOCUMENTS

| | | | | |
|---|---|---|---|---|
| 5,101,337 A | * | 3/1992 | Ebizuka | 700/81 |
| 5,133,046 A | * | 7/1992 | Kaplan | 706/52 |
| 5,293,323 A | * | 3/1994 | Doskocil et al. | 702/185 |
| 5,528,516 A | * | 6/1996 | Yemini et al. | 702/181 |
| 5,581,459 A | * | 12/1996 | Enbutsu et al. | 706/906 |
| 6,076,083 A | * | 6/2000 | Baker | 706/52 |
| 6,345,265 B1 | * | 2/2002 | Thiesson et al. | 706/52 |

* cited by examiner

*Primary Examiner*—Hal Wachsman
(74) *Attorney, Agent, or Firm*—Donald B. Paschburg (57) ABSTRACT

A system for generating a diagnosis of the probable cause of detected faults. Preferably, a user interface is provided and a Bayesien network is employed wherein probabilities are generated automatically and a manual process is used to construct a probability table. The system also allows multiple hypotheses and/or diagnoses to be presented simultaneously to the operator.

14 Claims, 7 Drawing Sheets

Detection and error time ratios.

Fig. 1

PRIOR ART

Fig. 2

PRIOR ART

Detection and error time ratios.

FAULT DIAGNOSIS IN A COMPLEX SYSTEM, SUCH AS A NUCLEAR PLANT, USING PROBABILISTIC REASONING

CROSS-REFERENCE TO RELATED APPLICATIONS

This application claims the benefit of U.S. Provisional Application No. 60/134,159, filed on May 14, 1999.

TECHNICAL FIELD

This invention relates to fault diagnosis in a complex system, such as a nuclear plant, using probabilistic reasoning techniques. In a preferred embodiment, a Bayesian network is utilized. The technique provides a way to capture knowledge and reach rational decisions in uncertain domains by casting the decision-making process as computation with a discrete probability distribution represented by a causal network. This technique also allow multiple hypotheses and/or diagnoses to be presented simultaneously to the operator.

BACKGROUND OF THE INVENTION

Modern complex systems such as nuclear power plants create challenges to the operating staff for understanding and trouble-shooting system problems. One important issue is posed by the large amount of information that the operator must absorb before making operational decisions. Although this issue is not conspicuous during normal operation, it becomes very important during abnormal or accident condition due to the limited decision time. Moreover, it is known that the reliability of human action is adversely affected at the time of crisis due to psychological factors. Decision support tools for helping the operator to perform diagnosis and initiate recovery action may greatly improve the system safety and reliability. For the purposes of explanation, the following description is based upon a nuclear power plant, with the understanding that the invention is applicable to other systems. "Intelligent" approaches to various diagnostic problems in the nuclear plant domain have been developed. One approach uses Probabilistic Risk Assessment that focus mainly on modeling the potential response of a reactor to an abnormal condition and its consequences. Other work explores AI and learning techniques such as artificial neural network and expert systems. With these approaches, it is difficult to explain how the system arrived at its decision to the user. Some expert systems are easier to explain, but do not correspond well to the probabilistic relationships between causes and effects that occur in complex systems due to the large number of degrees of freedom which are not observed.

Figure 1:
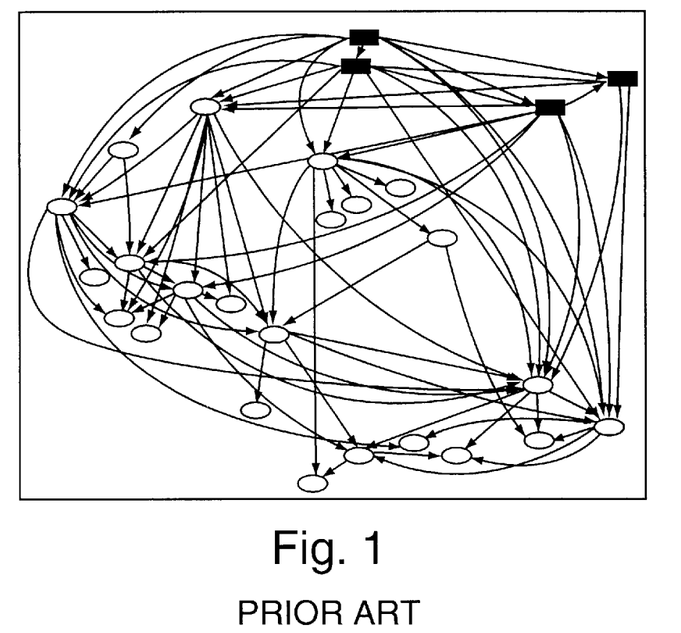
FIG. 1 shows an automatically generated network.
Figure 2:
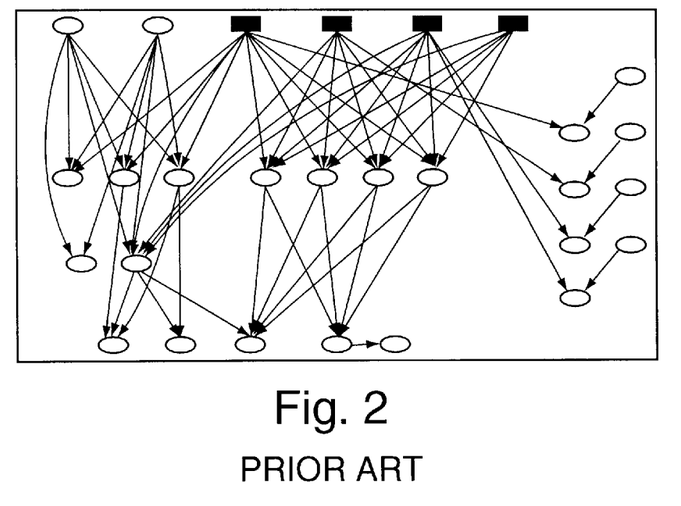
FIG. 2 shows an engineered network.

Bayesien networks may also be used. Exemplary Bayesien networks are shown in FIGS. 1 and 2. The network of FIG. 1 is constructed using an automated system, many of which are known to those of skill in the art. Although efficient, these systems often do not account for dependence between variables that only an expert would know.

Bayesien networks such as that of FIG. 2 may be constructed by hand. Although such networks may more accurately reflect underlying interrelationships, the manual method requires highly skilled engineers and is extremely time consuming.

In view of the above, there exists a need in the art for a system to diagnose faults in complex environments and which supports a comprehensible explanation of the results, as well as a strong correspondence to probabilistic relationships between causes and effects.

SUMMARY OF THE INVENTION

In accordance with the present invention, a graph of a casual network is constructed by hand based on the knowledge of an expert, and conditional probability tables are generated through automation. Additionally, a user interface is provided to conveniently display results. The graph of the network is a relatively simple object, well suited for human design. The conditional probability tables, on the other hand, may contain very many numbers. Thus automation is appropriate. A further advantage of designing the graph by hand, is that when adjustments to the probability tables by hand are unavoidable, due to inadequacies of the available data set, it is easier to adjust the tables in a manually created graph than one produced automatically. If the graph is constructed automatically, correcting a data problem may require the adjustment of certain conditional probabilities that seem unnatural and cannot be readily calculated. Another aspect of the invention includes using the probabilistic graph which is trained to provide a diagnosis based upon input of the extracted features from real line measurement values and outputting simultaneously multiple hypotheses through the graphical user interface.

DETAILED DESCRIPTION OF THE PREFERRED EMBODIMENT

Figure 3:
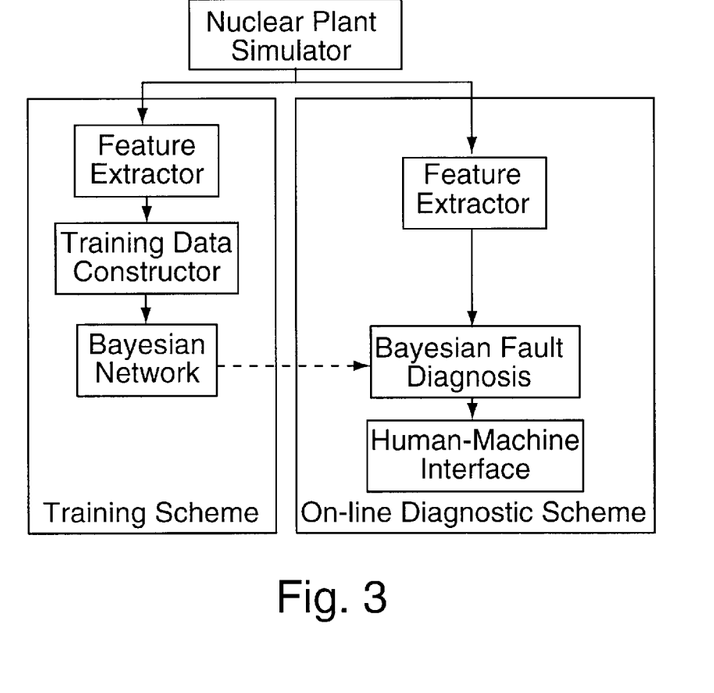
FIG. 3 shows a Bayesian network diagnostic development and testing system.

FIG. 3 illustrates the on-line diagnostic scheme as well as the off line training scheme. The simulator produces nearly fifteen hundred sensor measurements of which only less than 30 are being used. The feature extractor will transform these selected sensor values to produce the features. In the training scheme, these features are then compiled, formatted and compressed to an acceptable form for training the Bayesian network. The Bayesian network is then trained using the data produced by the training data constructor. The training process is off-line, however, in future on-site application, a semi-on-line process can be provided to periodically update the Bayesian network with new data.

During testing, the trained Bayesian network is then installed in the Bayesian fault diagnosis module. The outputs from the diagnostic module are basically the probability distribution for all query (fault) nodes. This result is transformed by the Human Machine Interface module to a more acceptable display for guiding the operator. The initial version of the display is traffic-light style, where red indicates fault(s) with highest (with respect to predefined threshold settings) probability. It is possible to have more than one red or a combination with yellow, as this condition is caused by multiple faults.

The human-machine interface scenario may eventually include a series of displays following the needs of the user. One display includes a graphical explanation of which observations trigger (or do not trigger) the diagnosis. This will allow the users to reason about and validate the diagnostic quickly. Furthermore, the user can simply point and click on any parameter to get full access of its probability distributions and history.

The task under consideration is to produce an early accident diagnosis system with coverage of all major fault classes. Various networks have been constructed. Their architectures are in between the fully engineered network (DAG) and a pure naive network where the query nodes are directly connected to the observation nodes.

In our initial test, we have produced a smaller system for diagnosing three types of primary circuit leak in a four-loop, pressurized water nuclear reactor. Specifically, we consider small leaks of the following types: (fluid) primary loop leaks (PSML), pressurizer steam leaks (PSL; through the pressurizer wall rather than through a stuck valve), and steam generator tube ruptures (SGTR1–4). Substantially all of these faults generate symptoms that are similar to a certain extent due to the fact that all cause a loss of coolant volume from the primary circuit. Under certain aggravating conditions, such as the failure of the main coolant pump in a loop that has experienced a tube rupture, the difficulty of discriminating among these faults is exacerbated.

Figure 4:
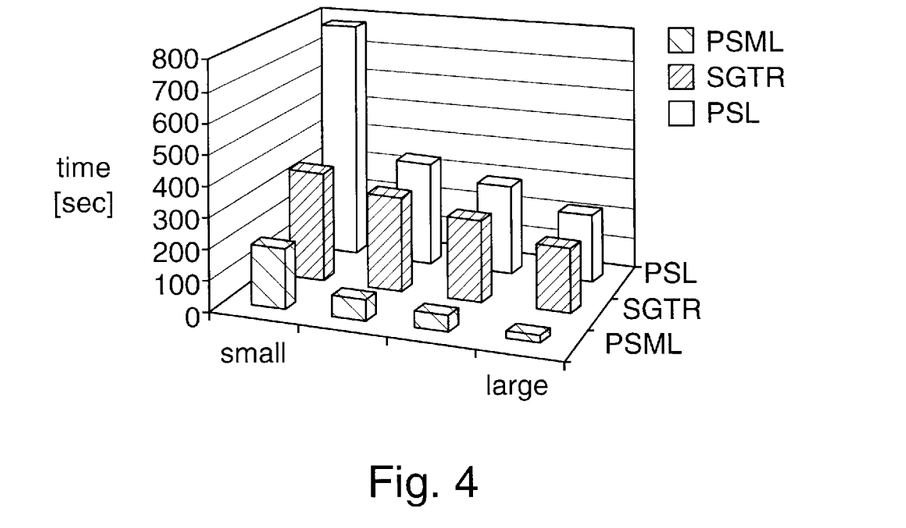
FIGS. 4–6 show various simulation results of a complex system.
Figure 5:
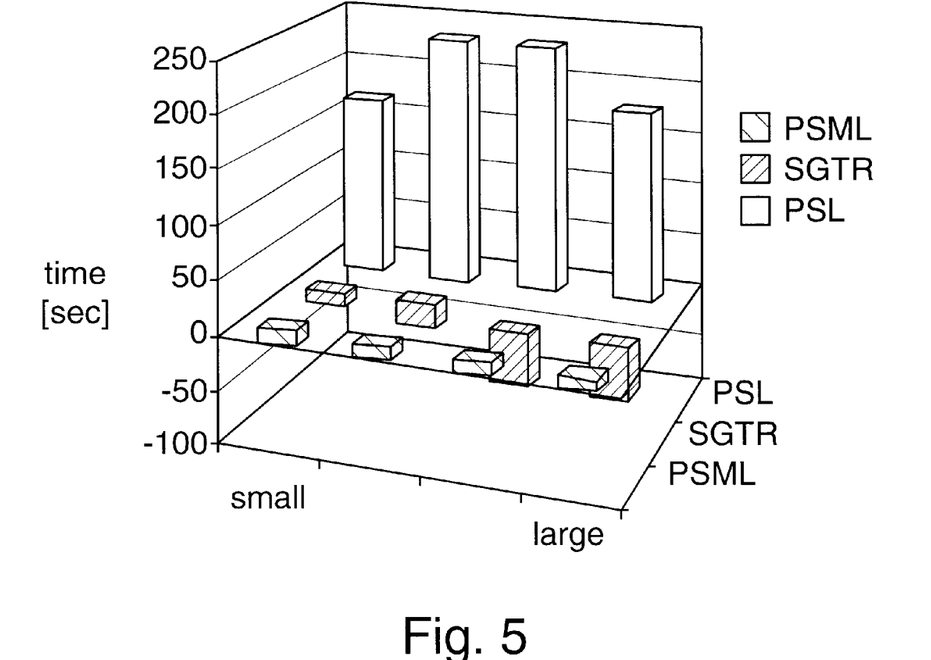
Figure 6:
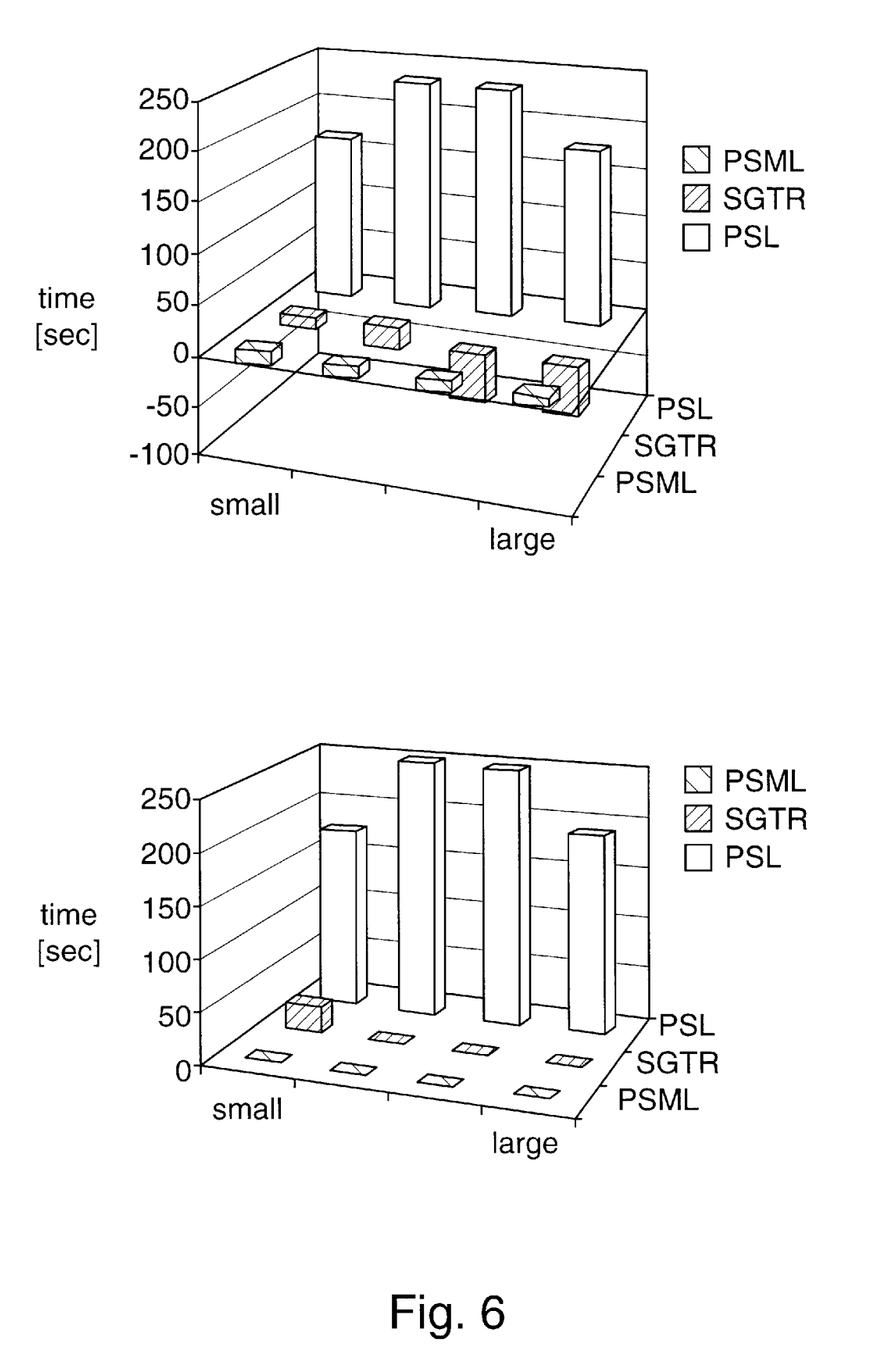

Simulated runs of one half hour in duration were generated for five sizes of each fault. The sizes chosen for the primary loop leaks and pressurizer leaks were between 0.3 and 10 $cm^2$ and for the steam generator tube ruptures were between 1 and 12 $cm^2$. Results on the benchmark task are shown in FIGS. 4, 5, and 6. The system was always able to determine the correct diagnosis, although incorrect diagnoses did appear transiently (for up to about three minutes) in some cases, most commonly for the pressurizer steam leaks, which were misclassified as primary loop leaks. The criterion used to determine the system's diagnosis based on the probability distribution contained in the Bayesian network was that the marginal probability of the presence of the fault given the observed evidence be greater than 0.5. The performance of the on the initial network on benchmark data was considered satisfactory.

In the following step we are expanding the coverage of the diagnostic module to include four initial conditions (100%, 60%, 30%, and missing loop 3). Six additional fault types are added to the diagnostic scheme, i.e., volume regulation system hot leak (VRHL), pressurizer safety valve open (PSVO), run up run down line feedwater supply leak (RURDLFSL), containment steam line rupture (CSLR), between-valve steam line rupture (BVSLR) and before-steam-generator feedwater supply leak (BSGFSL). Similar to the previous cases, five fault sizes are simulated for each of the new fault types.

Figure 7:
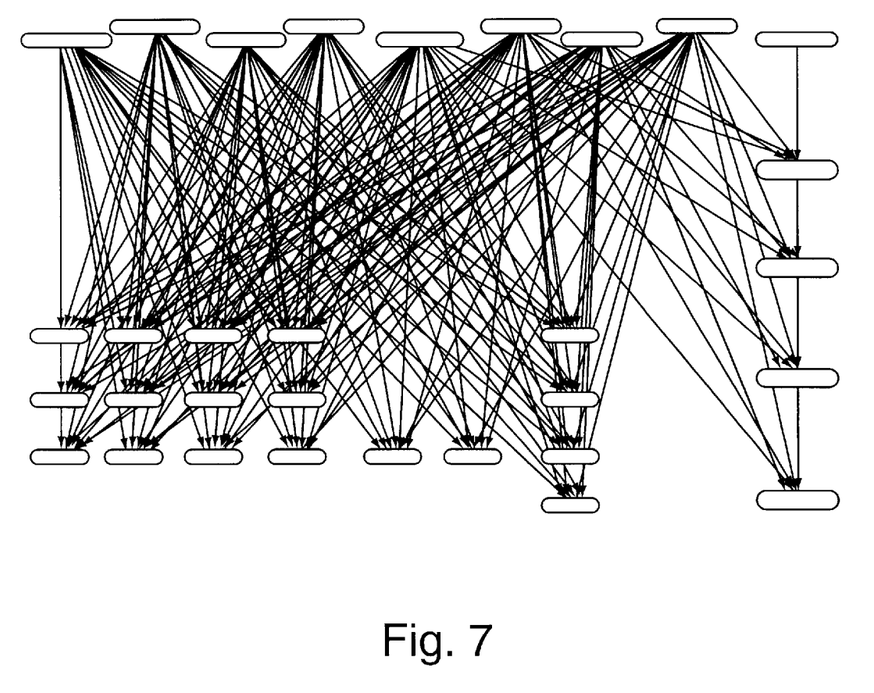
FIG. 7 shows an engineered naive network.

Two network architectures are considered: a slightly engineered naive network (FIG. 7) and an automatically learned general DAG.

Experiments are done following two different schemes. In the first scheme, the network is trained with all odd size faults across selected initial conditions (100% and 60% power, and missing loop 3). It is then tested on the even sizes across the same initial conditions. The result is quite good. The only errors were one unclassified case and one double classified case (classified as two faults).

Figure 8:
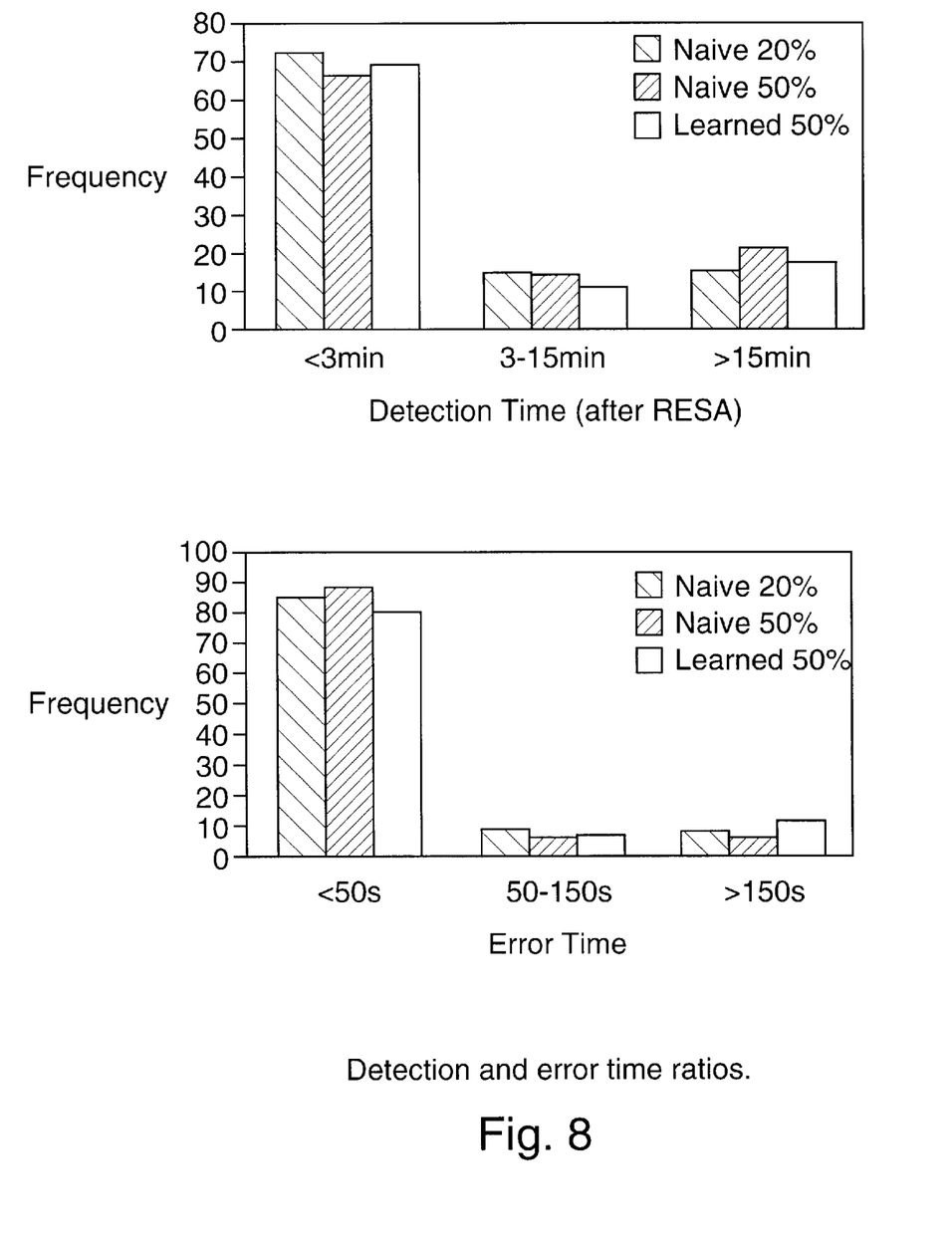
FIG. 8 shows a comparison between a naive network and an automatic learned network.

In the second scheme, the network is trained with all sizes across initial condition 100% and 60% power, and missing loop 3. Testing is done on all sizes within initial condition 30% power. Although misclassification only occurred once, there are about 15% cases which are unclassified. Future modification and refinement is expected to improve performance. FIG. 8 summarizes the results from the naive network and automatic learned network. It shows the performance ratio with respect to length of time required to detecting the fault and length of error time (i.e. time in which the system incorrectly indicates the presence of any fault).

The Graphical User Interface (GUI) of the complex system is a graphical representation of the information we want to convey to the operator. The GUI may be a simple information display (i.e., no input is solicited from the operator). This document is intended to assist discussions about the initial version of the GUI as well about a more ideal version to be produced in the future.

To produce the GUI, we need to make decisions in two areas:

The Bayesian network underlying the current diagnostic systems is capable of calculating various kinds of probabilistic information. We list the most attractive possibilities below in section 2. Which should we implement?

Given a choice of what information to display, how should the interface appear to the operator?

The interface for the diagnostic module should, to the greatest extent possible, have the following properties.

The underlying concepts (diagnosis names and semantics of the probabilistic information) should be comfortable for the operator The interface should not mislead the operator into an incorrect impression of the meaning of the diagnostic findings The interface, at least at the top-level, should be as simple as possible, in order to convey information quickly and easily to the operator Below we list some of the possible information that we may choose to display to the user. We make a distinction between a fault, by which we mean a condition like a steam tube rupture, and a diagnosis, which may consist of an assertion that multiple faults are present (e.g. a steam tube rupture and a small LOCA).

The most straightforward approach is to display simple probability of the presence of each fault, i.e. the probability that a given fault is present independent of what other faults may be present simultaneously. If the observed evidence is E and the potential faults are $F_1$ through $F_n$, we would display $P(F_1|E)$ through $P(F_n|E)$. The weakness of this approach is that it might be misleading for the multiple fault case. In particular, note that the most likely pair of faults is not necessarily the pair composed of the two faults that are most probable when considered alone. For example, in the figure below, in which we take the area of each set to be proportional to its probability, although P(A)=P(B)>P(C)=P(D), it is the case that P(C and D)>P(A and B).

Since the probability of the simultaneous presence of multiple faults decreases very fast as the number of simultaneous faults increases (i.e., three simultaneous faults is less-likely to occur than two simultaneous faults), one possible solution to the weakness of the single-fault probability choice is to only display probabilities for fault pairs (i.e. no triples, quadruples, etc.). That is, for all j and k, to display $P(F_j$ and $F_k|E)$. Despite the fact that this approach presents more detailed information than the single-fault approach, a remaining weakness of this approach is that it still does not handle the simultaneous presence of more than two faults.

The most probable diagnosis is that ordered set of values, one for each fault, which is most probable given the evidence, i.e arg min $P(F_1$ and $F_2$ and . . . and $F_n|E)$. The advantage of this approach is that the best simultaneous set of values for each diagnosis is displayed regardless of how many diagnoses are valid. One weakness, however, is that the magnitude of the probability of the most probable diagnosis is not very significant in the case where many explanations have similar probability. Another weakness is that it is not easy to calculate or display more than one, the most probable, explanation when there are many individual diagnoses (obviously, when there are N diagnoses there are $2^N$ explanations).

Figure 9:
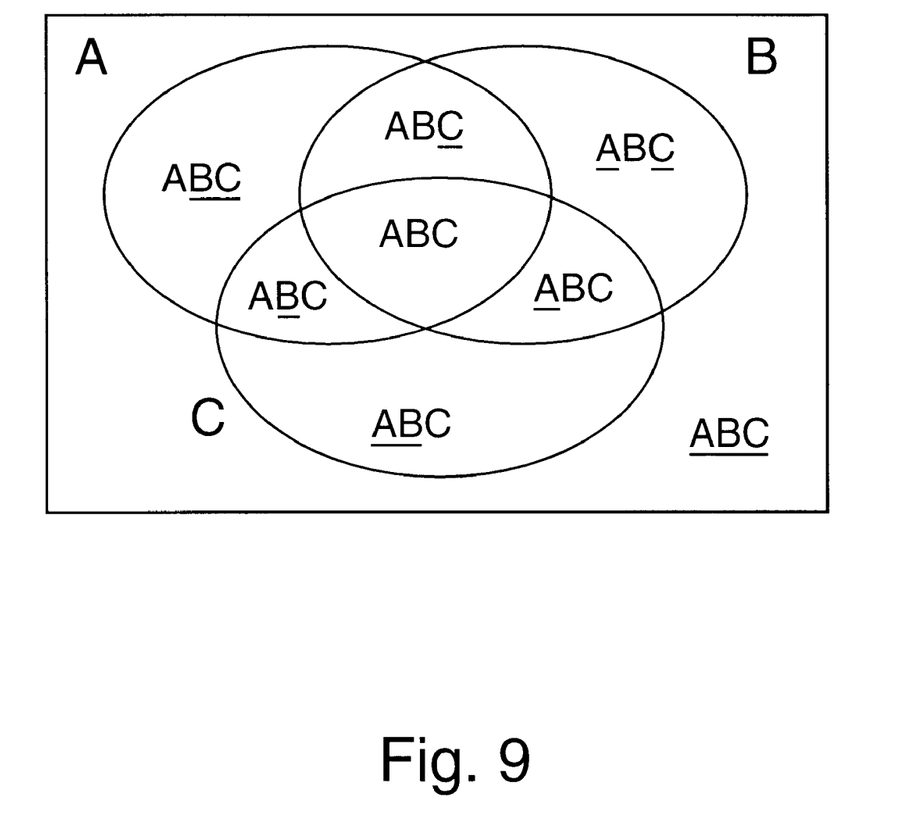
FIG. 9 shows various fault diagnosis options.

To make concrete the distinction between the various proposals, we provide the FIG. 9 below. In the diagram, A, B, and C are taken to be the names of single faults. Each of the atomic subsets of the diagram corresponds to one possible diagnosis. For example, the diagnosis that consists of the assertion that faults A and C are simultaneously present is labeled ABC (any diagnosis that is underlined is not present—note that the underlining is only visible when this document is viewed in printed form or viewed at high resolution on a monitor!). Then the single-fault option displays only P(A), P(B), and P(C) (we are neglecting conditioning on the evidence). Note that P(A)=P(ABC)+P(ABC)+P(ABC)+P(ABC), etc. The fault-pair option would display P(A only), P(B only), P(C only), P(AB), P(AC), and P(BC). Note that P(A only)=P(ABC), P(AB)= P(ABC)+P(ABC), etc. The most probable diagnosis option would display the probabilities of the most probable atomic subsets. If we take the size of the subsets to correspond to their probability, the three most probable diagnoses in FIG. 9 appear to be ABC, ABC, and ABC.

Regardless of the choice of the three options above, it is clear that, at least implicitly, we will be displaying information about probabilities to the user. The first issue to be dealt with regarding the appearance of the GUI, therefore, is how probability values will be represented. We propose three options below Bars (e.g. larger probability is a longer shaded rectangle)

Color

Continuous shades (e.g. larger probability is represented by a darker color)

Small number of discrete shades (e.g. green for ok, yellow for possible validity, red for near certainty that the diagnosis is valid)

Words (e.g. "low", "medium", and "high")

In addition to the best current diagnosis, it may be desirable to give a partial historical record of past diagnoses from the past few minutes. This will let the operator transcend the capabilities of the diagnostic system itself by using trend information in forming his final judgement. For example, the operator could make an argument of the form "A is the most probable diagnosis right now, but the probability of A seems to decrease over time whereas the probability of B is increasing. Therefore I expect that at some future time, B will be the most probable diagnosis." Of course, such arguments may or may not be helpful, depending upon the specific properties of a particular diagnostic system.

The diagrams below show how the interface might look and how the appearance should be interpreted. The purpose of these diagrams is not to advocate any one of them in particular, but rather to gain an understanding of which graphical elements and choices of information to display are most effective. They are given in no particular order.

Example one shows the simplest possible interface. Single-fault probabilities are displayed in three quantization levels, green (low), yellow (moderate), and red (high).

Example two is a straightforward presentation of event-pair probabilities. The two simultaneous faults are arbitrarily labeled "Fault 1" and "Fault 2". The case where only one fault is present is handled by the inclusion of a null fault, labeled "No fault" in the list for Fault 2. Obviously, it does not make sense to allow Fault 1 and Fault 2 to be the same. The result is an upper-triangular matrix of probabilities. Gray-level shading is used to represent the relative probability of an event pair with black being relatively high and white being nearly zero. This display technique may be weak in that under some circumstances it may be difficult for the eye to detect the difference between various levels of gray. Note that the total probability for all event pairs must sum to one. The most probable pair of faults (i.e. the most probable diagnosis) are indicated by highlighting their names in red.

Example three uses every possible display element with the exception of fault-pair probabilities. The specific choices for each element are given in the list below.

The most probable diagnosis is given by highlighting some combination of faults in red.

The single-fault probability is displayed using color by discretization to three levels as in Example 1.

Furthermore, the single-fault probability is represented in words as "unlikely", "somewhat likely" or "very likely"

The current and two previous values of the single-fault probabilities are also displayed as bars at the extreme right. For each diagnosis, there are three bars representing (from top to bottom), the oldest value for the relevant probability (in gray), the second-oldest value (also in gray), and the current value (in black).

This example displays fault-pair probabilities in a different way than example 2. Here the probability is given only for the most probable pairs. When Fault 2 would have been "No fault" in Example 2, here the entry for Fault 2 is simply left blank. Each fault name has been assigned a particular color to make obvious how many times each specific fault appears on the list (e.g. "STR Loop 3" can be assigned dark green, "Small LOCA" black, "Prim. Mini-Leak" blue). The third column displays the relative probability information in color and words as above. The fourth displays the probability information a third time as bars.

In this example, the four most probable diagnoses are displayed. While not shown in this example, in principle any number of simultaneous faults could be detected and displayed with this approach. Each row represents a single complete diagnosis, which may consist of an assertion that multiple faults are present. The presence of a fault is indicated by coloring the corresponding box red. At the far right, bars indicate the relative probability of each diagnosis.

A display of the underlying graph of the Bayesian network

An indication of which observations were of the greatest importance to the network in making its diagnosis Other graphical displays to explain the reasoning behind the diagnosis to the operator One can also display a confidence level indicator which indicates a degree of confidence that a current set of extracted features were well covered during training, wherein good coverage means a high level of confidence for a given hypothesis, and low coverage means a low level of confidence for a given hypothesis.

A scheme based on probabilistic-reasoning has been developed to identify faults immediately following a reactor trip. Satisfactory results were found for different fault types.

The scheme is then extended and generalized to include six more faults and three additional initial conditions. The preliminary testing shows good results for testing data in the same initial condition as the training data. The above describes the preferred embodiment of the invention. Various modifications and additions will be apparent to those of skill in the art and are intended to be covered by the following claims.

What is claimed:

1. A method for making a diagnoses in a complex system, comprising the following steps:

providing a causal network which is trained to provide a diagnosis based on input of extracted features from real time measurement values taken from said complex system, and providing a graphical user interface which is responsive to input of said extracted features for presenting to an operator responsible for making a diagnoses of the complex system, simultaneous multiple hypotheses as to the current condition of said complex system;

wherein said extracted features are determined using sensor measurement data produced by a simulation of said complex system, a graph for the causal network is constructed in a manual manner based on expert knowledge, and conditional probability tables for the causal network are constructed in an automated manner.

2. The method of claim 1 wherein providing, a graphical user interface includes presenting to the user a confidence level indicator which indicates a degree of confidence that the extracted features were well covered during training, wherein good coverage means a high level of confidence for a given hypothesis, and low coverage means a low level of confidence for a given hypothesis.

3. The method of claim 1 further comprising the step of selecting one or more items from said graphical user interface by clicking on said one or more items; and in response to said clicking, displaying a graphical explanation of which observations trigger or do not trigger said diagnosis.

4. The method of claim 3 further comprising the step of selecting a particular observation; and in response to said step of selecting a particular observation, displaying a probability distribution for said particular observation.

5. A method for making a diagnoses in a complex system, comprising the following steps:

providing a causal network which is constructed so as to model at least part of the complex system;

said providing step comprising the sub steps of:
simulating a specific fault condition,
extracting features from a result of said simulation, and training the causal network with said extracted features,
obtaining real time measurement values from said complex system,
extracting features from said real time measurement values, and
applying said extracted features from said real time measurement values to said causal network, so as to develop therefrom a diagnoses of said complex system;

wherein a graph for said causal network is constructed in a manual manner based on the knowledge of an expert, and conditional probability tables are constructed for said causal network in a automated manner.

6. The method of claim 5, wherein said complex system is a nuclear power plant and said diagnosis is of faults.

7. The method of claim 5, wherein said causal network comprises a Bayesian network.

8. The method of claim 5, wherein said real time measurement values are less than 50 in number.

9. The method of claim 5, wherein said features extraction is used directly to derive feature values.

10. The method of claim 5, wherein said causal network is used to derive the probability values for all faults.

11. Apparatus for assisting in diagnosing faults in a complex system, comprising:

a causal network which is trained to provide a diagnosis based upon input of extracted features from real time measurement values taken from said complex system, and a graphical user interface which is responsive to input of said extracted features from said causal network for presenting to an operator responsible for making a diagnosis of the complex system, simultaneous multiple hypotheses as to the current condition of said complex system;

wherein said extracted features are determined using sensor measurement data produced by a simulation of said complex system, a graph for the causal network is constructed in a manual manner based on expert knowledge, and conditional probability tables for the causal network are constructed in an automated manner.

12. The apparatus of claim 11 wherein said causal network includes:

means for simulating a specific fault condition;

training software, said training software being configured to extract features from a result of said simulation, and to train said causal network based upon said extracted features, and real time monitoring and diagnosis software, configured to extract features from a result of a real time fault or potential fault, and for comparing said features extracted from said real time fault or potential fault with features extracted from said simulated specific fault condition to develop therefrom a potential diagnosis.

13. The apparatus of claim 12 wherein said real time monitoring and diagnosis software provides plural possible potential diagnoses of said complex system, and assigns a probability to each.

14. The apparatus of claim 13 further comprising a computer arranged to generate a Bayesian network of conditional probability tables.

* * * * *